United States Patent [11] 3,624,304

[72] Inventors Ferdinando Formenti;
Giuseppe Valbonesi, both of Milan, Italy
[21] Appl. No. 842,160
[22] Filed July 16, 1969
[45] Patented Nov. 30, 1971
[73] Assignee Societa Italiana Telecomunicazioni Siemens S.p.A.
Milan, Italy
[32] Priority July 17, 1968
[33] Italy
[31] 19066 A/68

[54] BRANCH-LINE SWITCHING ARRANGEMENT FOR TIME-SHARING COMMUNICATION SYSTEM

8 Claims, 3 Drawing Figs.

[52] U.S. Cl. .......... 179/15 AA
[51] Int. Cl. .......... H04j 3/08
[50] Field of Search .......... 179/15 AA, 17 R, 17 D

[56] References Cited
UNITED STATES PATENTS

| | | | |
|---|---|---|---|
| 3,517,132 | 6/1970 | Rimlinger | 179/15 AA |
| 3,251,947 | 5/1966 | Schlichte | 179/15 AA |
| 3,071,651 | 1/1963 | Frankel | 179/15 AA |
| 3,060,267 | 10/1962 | Feder | 179/15 AA |

*Primary Examiner*—Kathleen H. Claffy
*Assistant Examiner*—Thomas W. Brown
*Attorney*—Karl F. Ross

ABSTRACT: A group of subscribers associated with a common exchange are divided into subgroups connectable by way in individual line switches to a common transmission line via respective branch lines whose residual energies are individually discharged, between successive conversation time slots, into normally disconnected impedances matching the characteristic impedances of these branch lines; in like manner, and at the same time, the common transmission line is also discharged into a normally disconnected matching impedance.

F. FORMENTI
G. VALBONESI
INVENTORS

BY: Karl F. Ross
Attorney

F. FORMENTI
G. VALBONESI
INVENTORS

BY Karl F. Ross
Attorney

BRANCH-LINE SWITCHING ARRANGEMENT FOR TIME-SHARING COMMUNICATION SYSTEM

Our present invention relates to a switching arrangement for a time-sharing communication system wherein a large number of local stations (hereinafter referred to as subscribers) can selectively communicate with one another during recurring time intervals in which the amplitudes of their voice currents or other signals are sampled.

In such a system the sampled signal amplitude is generally stored on a condenser connected across the talking subscriber line, the stored energy being transferred during the allotted time interval to a similar condenser in the input of the receiving subscriber whose line includes a low-pass filter for integrating consecutive sampling pulses. As mentioned in our copending application Ser. No. 645,685, filed 13 June 1967, now U.S. Pat. No. 3,499,119, energy loss is minimized by a resonant transfer of such energy from one condenser to the other, through the intermediary of a series inductance which tunes the condenser capacitance to a frequency whose period equals twice the sampling interval whereby the discharge current follows a half-cycle of a sine wave. Even with such resonant transfer, however, some residual energy is still likely to remain stored in the line reactances and may lead to undesirable crosstalk between successively established communication channels. This residual energy may be dissipated by a switching operation during the guard interval separating successive conversation time slots, e.g. by momentarily grounding the corresponding lines.

As the effective line impedance changes with the addition or elimination of junctions giving access to other subscriber lines, compensating adjustments must be made to maintain proper tuning for the aforedescribed transfer of energy. This usually requires the provision of ancillary reactances such as shunt capacitances whose dimensioning depends on the number and distribution of these junctions and on the length of the associated transmission lines.

The general object of our present invention is to provide a system for telephone and other telecommunication purposes in which the task of calculating the necessary reactances for resonant energy transfer is simplified.

Another object of this invention is to provide a system of this type wherein any residual line energy is virtually completely dissipated during the aforementioned guard intervals to eliminate any vestigial crosstalk.

In accordance with out present invention, we provide a network of transmission lines which includes at least one main line, a plurality of branch lines after in parallel across this main line, and a plurality of subscriber lines connected in parallel across each branch line; several such main lines, in turn, may be similarly connected in parallel across a common transmission line to form a higher-order grouping, and analogous further groupings of still higher order are also possible. The several subscriber lines of each branch line are provided, near their junctions with the associated branch lines, with normally open individual line switches (generally of the electronic type) which are selectively closable during the allotted sampling interval or conversation time slot to establish a communication channel between any two subscribers; similar line switches are also inserted in each branch line near its junction with the main line. Such channel may involve only a single-branch line, if the two communicating subscribers are both connected to that line, or a pair of branch lines with an intervening main-line section; in lieu of two communicating local subscribers, the communication path may also connect one such subscriber with a trunk line leading (e.g. from the main line) to a remote exchange which may be equipped with a similar line network.

In any case, the branched structure of the line network according to our invention allows branches with an assigned number of subscriber lines to be added or removed without materially altering the effective line impedance between two communicating subscribers on a different branch or pair of branches.

In accordance with a more specific feature of our invention, each of the branch and main line (as well as higher-order common lines, if any) is provided with a terminating impedance which advantageously matches the characteristic impedance of the respective line and is normally open-circuited by a (generally electronic) circuit breaker controlled by a timer; the latter generates, during the guard intervals between gating pulses establishing the conversation time slots, periodic switching pulses which reverse at least those circuit breakers whose lines have participated in the establishment of the immediately preceding communication channel in order to connect these lines across their respective terminating impedances to discharge their residual energies. Although in principle, the selector controlling the line switches could also select the circuit breakers to be thus reversed, it will generally be more expedient to reverse all the circuit breakers of the network simultaneously.

The invention will be described in greater detail hereinafter with reference to the accompanying drawing in which.

Figure 1:
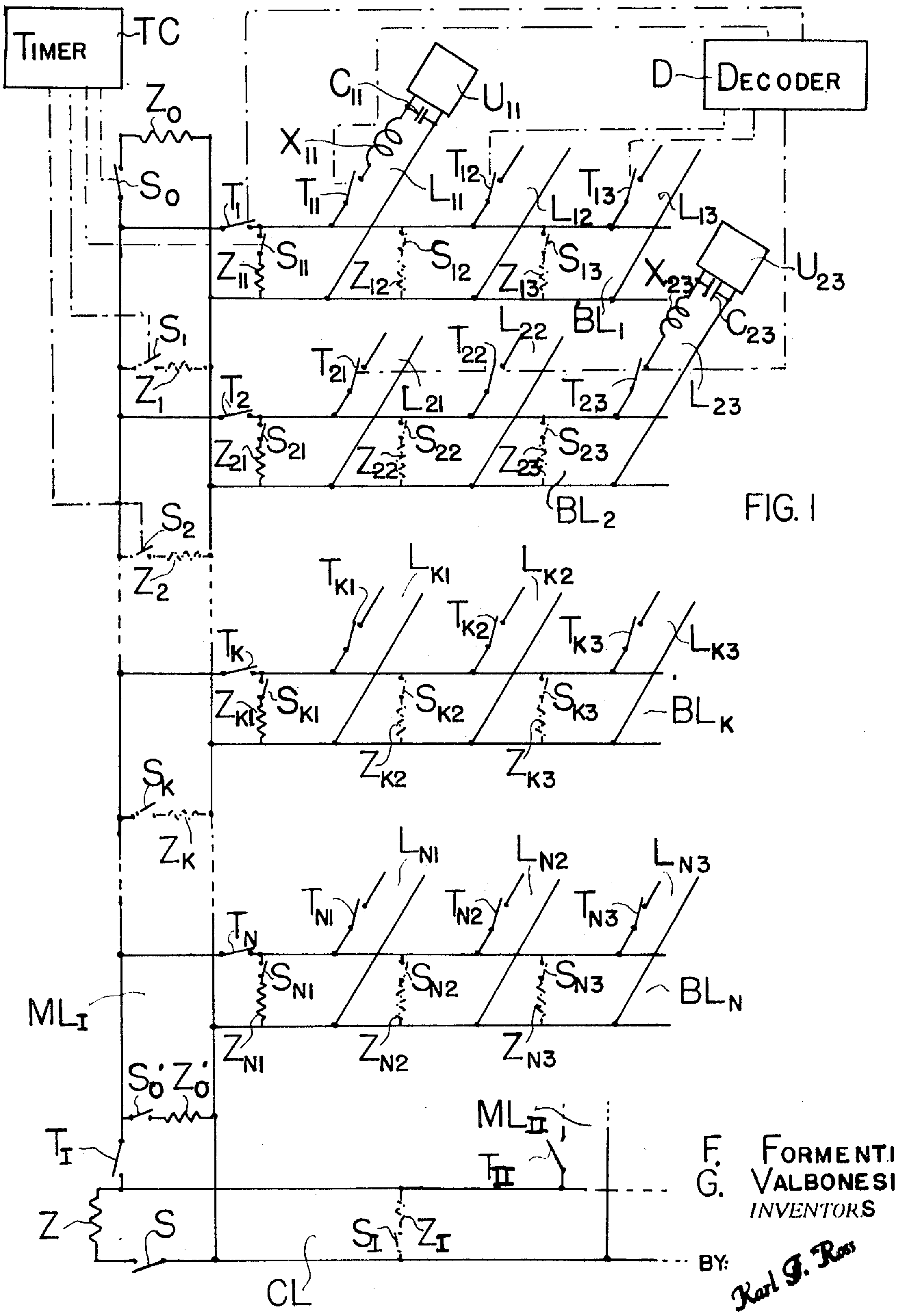
FIG. 1 is a circuit diagram showing a line network according to our invention.

In FIG. 1 we have shown a group of subscriber lines divided into *n* subgroups $L_{11}$, $L_{12}$, $L_{13}$...; $L_{21}$, $L_{22}$, $L_{23}$...; $L_{K1}L_{K2}$, $L_{K3}$...; $L_{N1}$, $L_{N2}$, $L_{N3}$... The subscript K denotes any intermediate subgroup between the first subgroup designated by the subscript 1 and the last subgroup designated by the subscript N.

Only two subscriber lines, $L_{11}$ and $L_{23}$, have been shown complete with respective subscriber stations $U_{11}$ and $U_{23}$ storage condensers $C_{11}$ and $C_{23}$, and tuning inductances $X_{11}$ and $X_{23}$. All the subscriber lines are provided with respective line switches $T_{11}$—$T_{13}$, $T_{21}$—$T_{23}$, $T_{K1}$—$T_{K3}$, $T_{N1}$—$T_{N3}$ normally open-circuiting these lines.

The lines $L_{11}$–$L_{13}$ of the first subgroup are connected in parallel across a branch line $BL_1$; corresponding branch lines $BL_2$, $BL_k$ and $BL_N$ are provided for the remaining three subgroups illustrated in FIG. 1. These branch lines, in turn, are connected in parallel across a main line $ML_1$. Several such main lines, of which only one other line $ML_{11}$ has been partly illustrated, are connected in parallel across a common line CL constituting a higher-order transmission link.

Branch lines $BL_1$—$BL_N$are normally open-circuited by secondary line switches $T_1$, $T_2$, $T_K$, $T_N$which, together with primary switches $T_{11}$ etc., are selectively closable by a decoder D under the control of a logic network not shown. The basic operation of such a decoder is well known per se and of no direct relevancy to the present invention. Reference may be made, for example, to commonly assigned copending application Ser. No. 802,486, filed 26 Feb. 1969 by Saverio Martinelli and Giorgio De Varda, and to the corresponding Italian Pat. No. 824,625. According to these prior disclosures, the decoder may respond to address information stored in a calling-subscriber memory and in a called-subscriber memory for concurrently closing the line switches of the corresponding subscribers (here $U_{11}$ and $U_{23}$) during a particular time slot assigned to these subscribers within the circulating memories.

In our present system, decoder D is arranged to close during each time slot only those line switches which are essential to the establishment of the desired communication channel and which in the present instance are the switches $T_{11}$, $T_{23}$, $T_1$ and $T_2$.

If the subscriber $U_{11}$ wants to communicate, say, with a subscriber served by one of the branch lines of main line $ML_{II}$, decoder D would also close the third-order line switches $T_1$ and $T_{II}$ in addition to switches $T_{11}$, $T_1$ and corresponding switches of the other branch line.

Each of the branch lines $BL_1$—$BL_N$is provided with a respective terminating impedance $Z_{11}$, $Z_{21}$, $Z_{k1}$, $Z_{nl}$ matching the characteristic impedance of the respective line as modified by the effective capacitances of the associated subscriber lines connected thereacross in series with the open line switches $T_{11}$etc. These terminating impedances are in series with respective electronic circuit breakers $S_{11}$, $S_{21}$, $SK_1$, $SN_1$ which are periodically reversed under the control of a timer or clock circuit TC. Main line $ML_l$ is shown provided with two such terminating impedances $Z_0$, $Z_0'$ at opposite ends, in series with respective circuit breakers $S_0$, $S_0'$. It will be understood that the branch lines $BL_1$ etc. may also have a second set of terminating impedances and circuit breakers at their remote ends. In an analogous manner, common line CL is provided with a terminating impedance Z in series with a circuit breaker S; a second such impedance and circuit breaker may again be connected across the remote end of that line. Impedances $Z_0$, $Z_0'$ match, of course, the characteristic impedance of line $ML_l$, even as impedance Z matches that of line CL, as modified by the effective capacitances of their respective feeder lines and the corresponding line switches.

With circuit breakers $S_{11}$, $S_{21}$, $SK_1$, $SN_1$, $S_0$, $S_0'$ and S concurrently closed during the guard interval between any two consecutive sampling intervals, the residual energy stored in the line segments forming part of any previously established transmission channel is fully dissipated and will not affect the signal level in any subsequently established channel.

Figure 2:
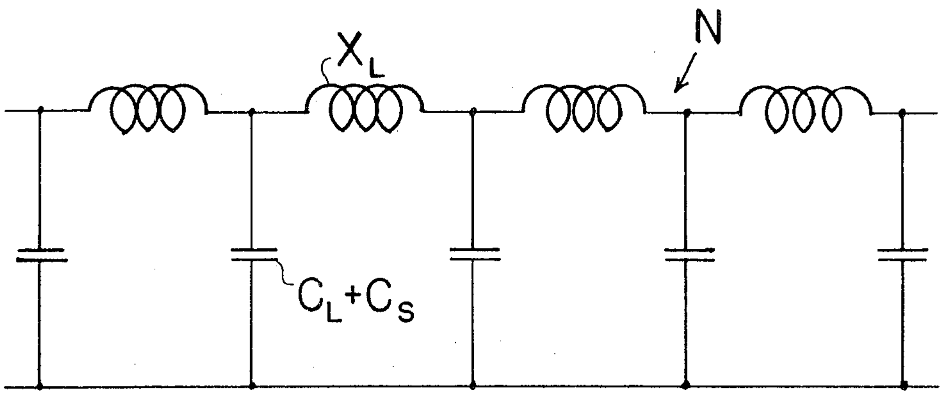
FIG. 2 shows an equivalent circuit for part of the network of FIG. 1.

The physical line network illustrated in FIG. 1 may be likened to a $\pi$-type four-terminal network as partly illustrated at N in FIG. 2, each of the sections of this equivalent network representing a segment of line $ML_l$extending between the junctions with two adjoining branch lines. The distributed inductances of these line segments have been represented in FIG. 2 by series reactances $X_L$ while the distributed line capacitances $C_l$ and the effective capacitances $C_S$ of the open-circuited branch lines are represented by the shunt arms of the network. On the assumption that the capacitances of the several branches are substantially identical, and with uniform spacing of the branch junctions along the main line $ML_l$, the change in characteristic line impedance caused by the addition or removal of any branch line may be easily calculated.

The aforedescribed principle of our invention may be extended with the subdivision of each line into a plurality of sections terminated by individual shunt impedances in series with respective circuit breakers; these additional impedances and circuit breakers, illustrated in dot-dash lines in FIG. 1, have been designated $Z_{12}$, $Z_{13}$ and $S_{12}$, $S_{13}$ for branch line $BL_1$ and have been identified by analogous subscripts in the other branch lines. Similar sections are defined by terminating impedances $Z_1$, $Z_2$, $Z_K$and circuit breakers $S_1$, $S_2$, $S_K$ in main line $ML_l$ as well as by an impedance $Z_l$ and a circuit breaker $S_1$ in common line $C_L$. In each instance, the line section extending between two terminating impedances contains only a single junction with a lower-order feeder line. In this case, all the terminating impedances (including those previously referred to) will match the characteristic impedances of the adjoining line segments; in the ideal system, all these characteristic and terminating impedances will be identical.

The addition of a new subscriber line to an existing branch line, of a new branch line to an existing main line or of a new main line to an existing common line will then require only the insertion of a supplemental terminating impedance and circuit breaker adjacent the new junction.

Figure 3:
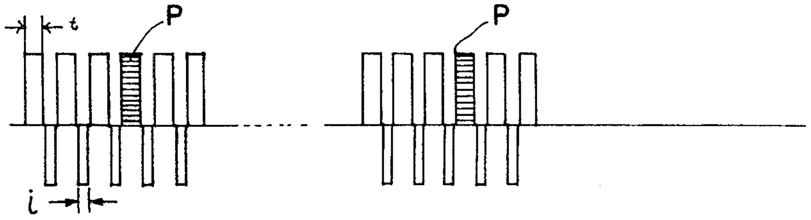
FIG. 3 is a timing diagram relating to the operation of the system of FIG. 1.

FIG. 3 shows successive time slots *t*, during which communication channels are established by the closure of selected line switches such as the switches $T_1$, $T_2$, $T_{21}T_{23}$ mentioned above, and the intervening guard intervals *i* during which all the circuit breakers shown in FIG. 1 are closed simultaneously. The cadence of time slots *t* may be on the order of 1$\mu$-sec, with the interval *i* representing a fraction of that period; the recurrence rate of a specific gating pulse P, such as the one controlling the aforedescribed line switches $T_1$, $T_2$, $T_{11}$, $T_{23}$, may be on the order of 100$\mu$sec.

Although, for simplicity, the several line switches and circuit breakers have been illustrated as movable contacts, it will be understood that in the practical realization they will all be in the form of transistors or other electronic devices.

We claim

1. A communication system with a network of transmission lines including at least one main line, a plurality of branch lines connected in parallel across said main line, and a plurality of subscriber lines connected in parallel across each of said branch lines; a set of normally open individual line switches provided in said branch lines near their junctions with said main line and in said subscriber lines near their junctions with the respective branch lines; selector means for closing different combinations of said line switches during recurrent time intervals to establish communication between different pairs of said subscribers; individual terminating impedances for each of said branch lines and for said main line substantially matching the characteristic impedances of the respective lines in the open condition of said line switches; normally open circuit breakers in series with said terminating impedances; and timer means for closing at least certain of said circuit breakers during instants between said recurrent time intervals for dissipating residual energy from at least the lines participating in the establishment of the immediately preceding communication.

2. A system as defined in claim 1 wherein said network includes at least one additional main line, with associated branch lines and subscriber lines connected across the latter, and a common line having said main lines connected in parallel thereacross.

3. A system as defined in claim 2 wherein said common line is provided with an additional terminating impedance and with a normally open circuit breaker, controlled by said timer means, in series therewith.

4. A system as defined in claim 1 wherein the terminating impedance and circuit breaker of each branch line are connected thereacross at a point separated from said main line by the line switch of the respective branch line.

5. A system as defined in claim 1 wherein all said circuit breakers are connected to said timer means for periodic and concurrent reversal after each time interval allotted to the establishment of communication.

6. A system as defined in claim 1 wherein each of said subscriber lines is provided with a shunt capacitance and a series inductance for resonant energy transfer between communicating subscriber lines during said recurrent time intervals.

7. A system as defined in claim 1 wherein said branch lines are each divided into a plurality of sections containing junctions with respective subscriber lines, said sections being provided with individual terminating impedances and circuit breakers controlled by said timer means.

8. A system as defined in claim 1 wherein said main line is divided into a plurality of sections containing junctions with respective branch lines, said sections being provided with individual terminating impedances and circuit breakers controlled by said timer means.

* * * * *